Figure 1:
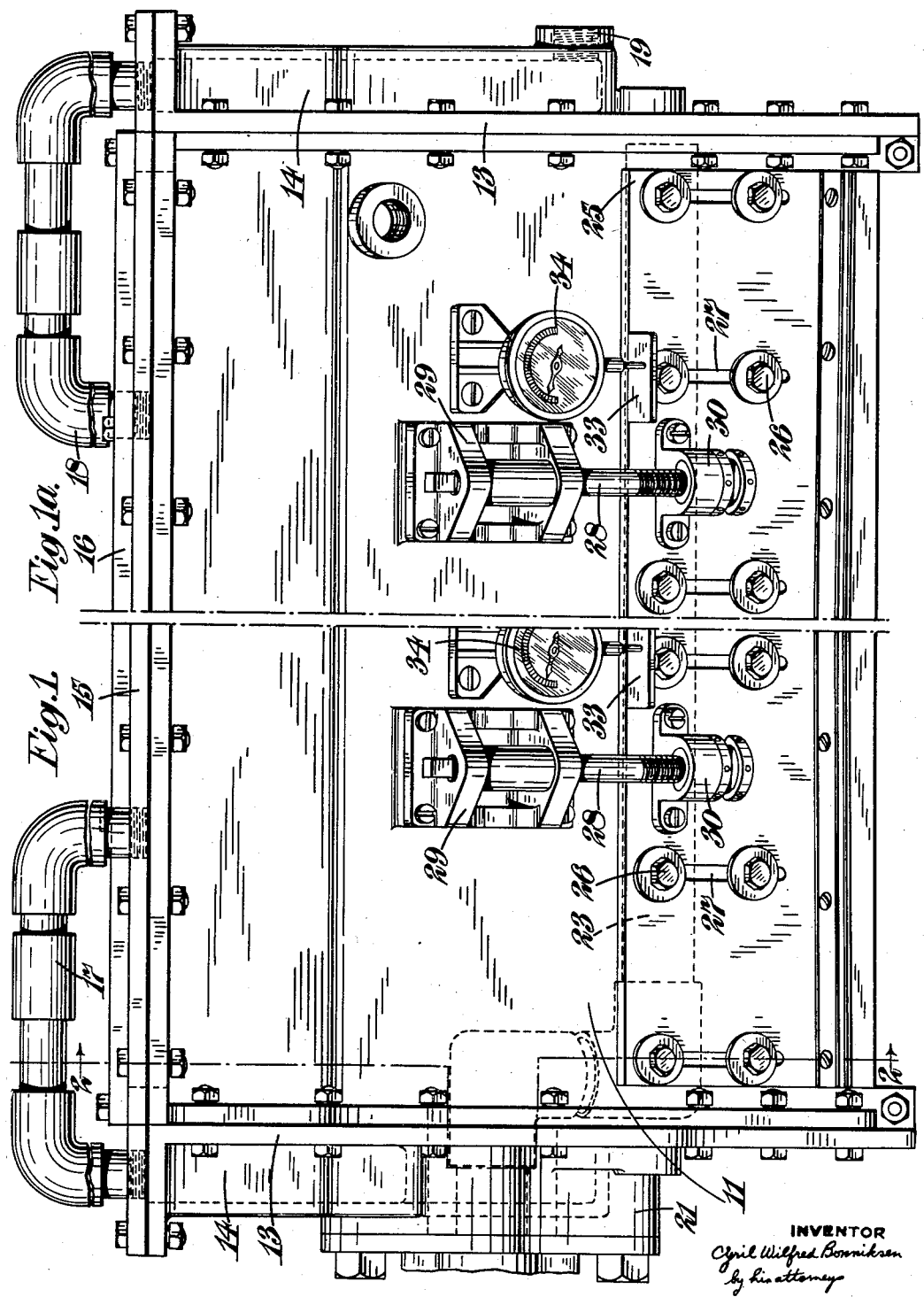

Oct. 9, 1934.   C. W. BONNIKSEN   1,976,539
PRODUCTION OF FILMS AND COATINGS OF CELLULOSIC MATERIAL
Filed Sept. 23, 1933   4 Sheets-Sheet 1

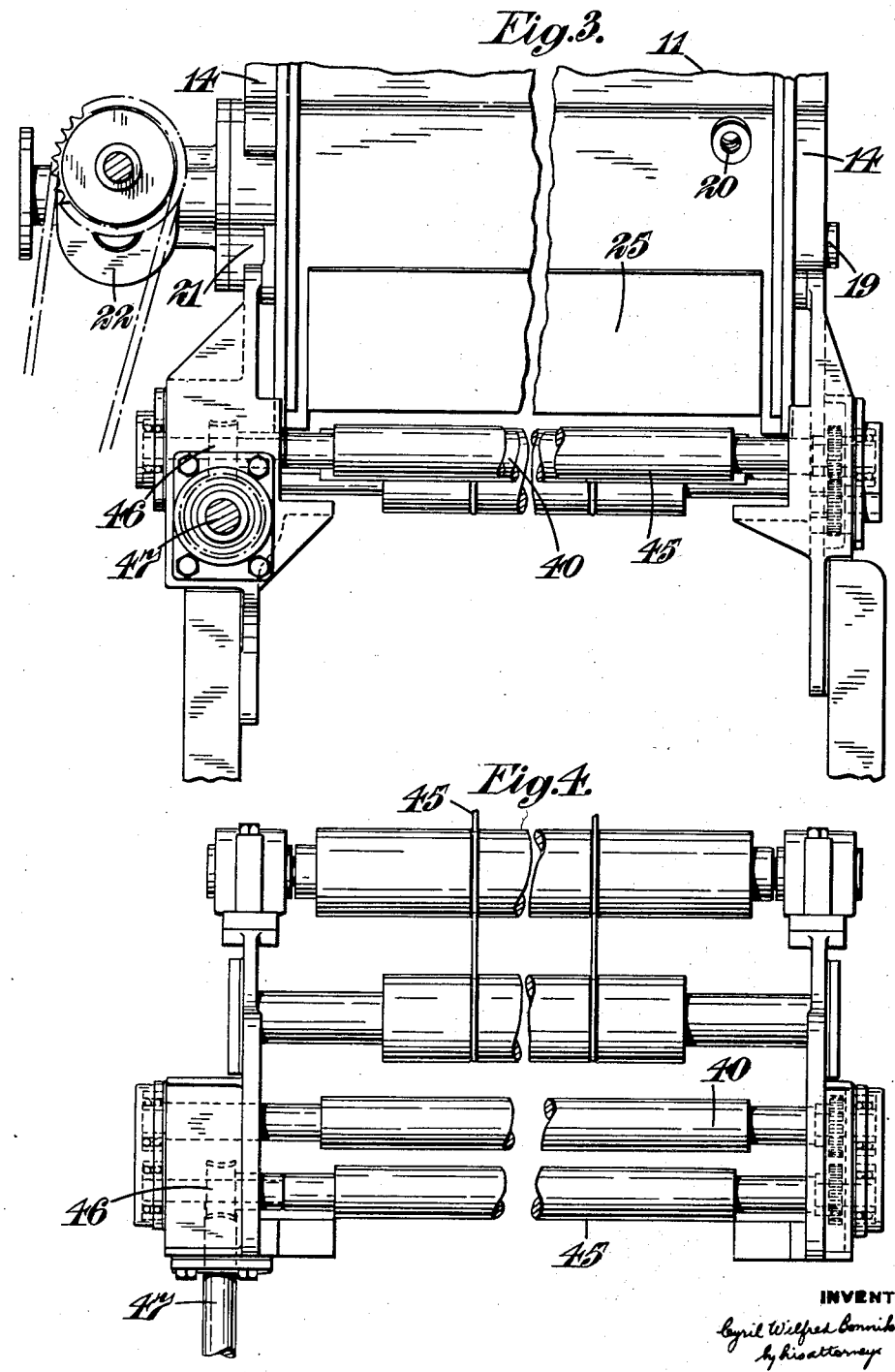

Oct. 9, 1934.         C. W. BONNIKSEN                1,976,539
PRODUCTION OF FILMS AND COATINGS OF CELLULOSIC MATERIAL
Filed Sept. 23, 1933        4 Sheets-Sheet 4

Patented Oct. 9, 1934

1,976,539

UNITED STATES PATENT OFFICE 1,976,539

PRODUCTION OF FILMS AND COATINGS OF CELLULOSIC MATERIAL

Cyril Wilfred Bonniksen, Slough, England, assignor to Protectoglass Limited, London, England, a British company Application September 23, 1933, Serial No. 690,758
In Great Britain June 4, 1932

12 Claims. (Cl. 18—15)

The invention comprises improvements in or relating to the production of films and coatings of cellulosic material.

It is an object of the present invention to provide means for producing a film of cellulosic material, for example a film to be applied as a coating on a surface of sheet material, as described in my copending United States application Ser. No. 627,501.

In the aforesaid specification there is described a method of applying sheet cellulosic material to the surface of a sheet of glass consisting in extruding it through a feed slot downwardly on to the glass as the glass is caused to pass slowly below the slot. In carrying such a process into practical effect various difficulties arise, or may be encountered due to partial evaporation of the solvent as it leaves the feed slot, which tends to cause accumulations of partially coagulated cellulosic material about the mouth of the slot and to prevent the production of a uniform coating, as well as leading to the obstruction of the slot.

A further difficulty which arises relates to the fact that when coatings are to be applied to sheets of width other than the full width of the slot it is necessary to deal with the excess cellulosic material exuding at the sides of the slot in a satisfactory manner.

According to the present invention there is provided, in apparatus for the production of films or coatings of cellulosic material, the combination of a hopper, a feed slot for cellulosic material in the bottom of the hopper, and a continuously rotating roller below the feed slot to receive issuing cellulosic material therefrom and to draw it away from the slot at a predetermined rate.

Such a device is calculated to draw from the hopper cellulosic material at a constant rate in the form of a film extending between the feed slot and the roller. Such an apparatus can be employed for the production of films direct when used in conjunction with a coagulating bath as set forth in my co-pending United States application Serial No. 690,757 of the same date as the present application.

Alternatively, it can be employed according to the present invention for coating sheets of material, for example glass, with a layer of cellulosic material. In this case the apparatus includes means to feed the sheet material beneath the feed slot and above the roller so that it cuts through the normal path of a film from the slot to the roller. In this case it will be found that the sheet of cellulosic material is cut, while in the plastic state, by the forward edge of the advancing sheet material and a section of it is caused to adhere to the sheet material while any surplus on either side of the sheet material continues to feed on to the roller and undue accumulations of cellulosic material toward the side edges of the feed slot are avoided.

A further important feature of the invention relates to the form of the feed slot, the hopper being provided with two lips each adjustable by screw adjustments so that they may be set exactly parallel and at the same horizontal level. It is found that such a slot, if the viscosity and evaporative qualities of the cellulosic solution are suitably adjusted, will continue to feed the celluloid film over long periods without accumulation of solidified cellulose at the slot. Adjustment of the viscosity and evaporative qualities of the cellulosic solution may be effected partly by using a proper quantity of solvent, and partly by regulating the temperature of the solution.

The invention includes a process of applying cellulosic films to glass or other sheet material, consisting in passing the sheet material at a uniform rate below a feed slot and above a roller situated under the feed slot so that the sheet material becomes coated on its upper side with a cellulosic film.

One form of apparatus in accordance with the invention will now be described by way of example with reference to the accompanying drawings, in which:—

Figure 2:
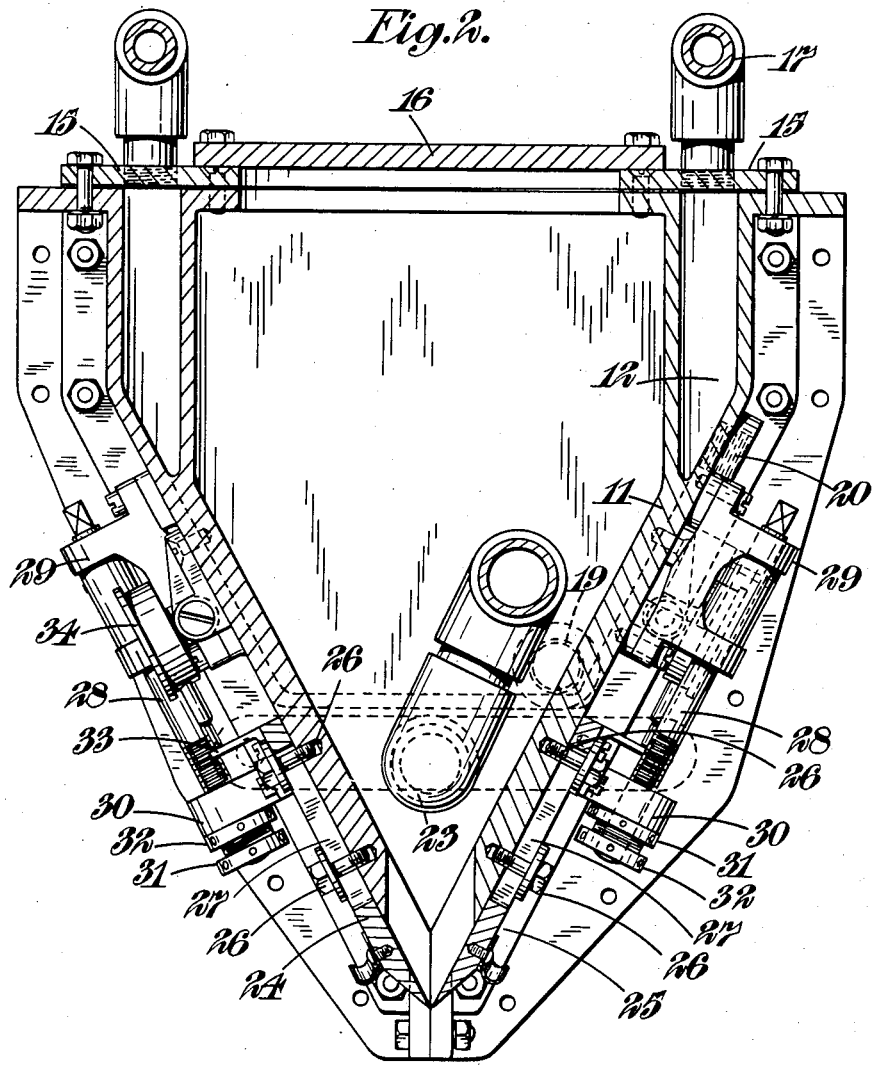
Figure 5:
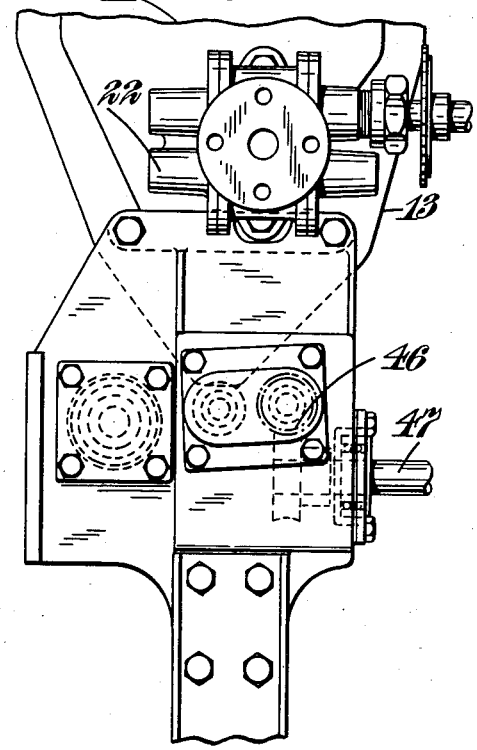
Figure 6:
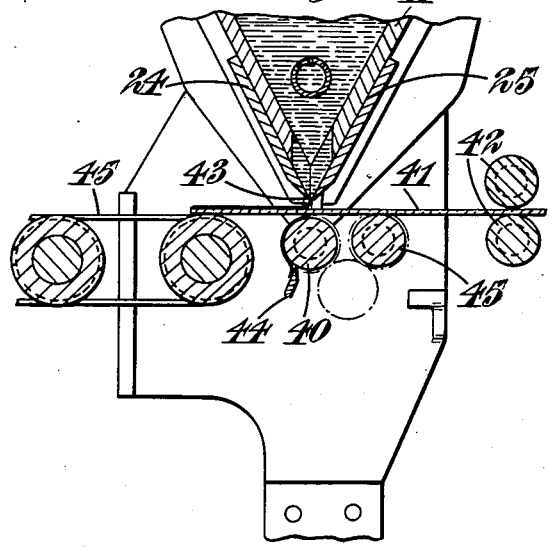

Figure 1 is a front elevation of a hopper;
Figure 2 is a vertical cross section of the same;
Figure 3 is an elevation on a reduced scale showing the hopper above means for feeding sheet glass therethrough;
Figure 4 is a plan of part of the apparatus shown in Figure 3 the hopper being removed;
Figure 5 is an end elevation of the parts shown in Figure 3;
Figure 6 is a detail section through the operating parts at the bottom of the hopper.

Referring to Figures 1 and 2, the hopper 11 is rectangular in plan and substantially V-shaped in cross section. The main body of the hopper is cast with a water jacket 12 in the walls of the upper part and the end walls 13 have waterjacket portions 14 cast upon them. The water jackets 12 and 14 are covered by plates 15 and the central portion of the hopper is covered by a separate plate 16. The end jackets are connected to the side jackets by pipe connections 17, 18 and a suitable inlet 19 is provided at one end and an outlet 20 at one side of the water jackets. Provision is made for circulating ice-cold water through these jackets to maintain the solution at an appropriate temperature in the hopper.

A pump base 21 is formed on one end of the hopper and to this is secured a gear pump 22 (see Figures 3 and 5) which delivers into the base 21 and thence to an inlet pipe 23 shown in dotted lines in Figures 1 and 2. The pipe 23 is closed at the end but provided with a number of openings in its upper side so that the celluloid or other collulosic solution is introduced into the hopper at a uniform number of positions above the slot in the bottom and from end to end thereof.

The outer sloping faces of the hopper 11 are machined true and flat and they support two adjustable plates 24, 25 which are slidably secured in place by means of set-screws 26 working in slots 27 in the plates.

Adjustment screws 28 are journalled in brackets 29 on a fixed portion of the hopper walls and the threaded portion of these screws works in nuts 30 on the sliding plates 24, 25.

Pallets 33 are secured to the plates 24, 25 and against these pallets press dial test indicators 34 which serve to show on the dial to within one thousandth of an inch the exact position of the sliding plates 24, 25.

The dial test indicators are set so that when the lower edges (which are very sharp and true) of the plates 24, 25 just meet one another the test indicators show zero. By screwing up the screws 28 slightly the plates 24, 25 may be drawn apart to an extent which can be accurately judged from the test indicators so as to provide a parallel slot the opening of which is exactly even throughout and may be of the order of .07 of an inch.

As will be understood the pump 22 is driven by suitable power at a uniform and predetermined rate so as to maintain celluloid in the hopper 11 at a constant level.

Below the hopper 11 there is a roller 40 on to which celluloid solution issuing from the hopper falls. Referring to Figure 6 it will be seen that sheet glass 41 may be fed by feed rollers 42 at a constant and uniform rate between the roller 40 and the hopper 11 so as to cut through a film 43 of celluloid solution descending from the hopper on to the roller 40. The glass becomes therefore coated with a film of celluloid on one side which is of uniform thickness and any excess of the film of celluloid continues to feed on to the roller 40 from which it is scraped by a doctor 44. The glass passes on to a conveyor 48 consisting of flexible steel cables which carries it beneath a bath of castor oil as described in prior United States specification Ser. No. 627,501 hereinabove referred to.

Referring to Figures 3 and 5 it will be seen that the roller 40 and the feed roller 45 immediately behind it are each driven through gearing contained in a box 46 from a shaft 47. The same shaft serves to drive the feed rollers 42, the conveyor 48 being separately driven by means not shown, and thus the sheet of glass is passed beneath the feed hopper at a predetermined rate which corresponds with the rate at which the roller 40 draws the solution through the feed slot of the hopper 11. Consequently the thickness of the film on the glass will be the same as that of the film deposited on the roller 40 and will depend upon the relative rate of the pump 22 and the roller 40 and not upon the precise width of the slot above the glass.

Preferably a float is disposed on the surface of the liquid in the hopper 11 having an indicating wire projecting through the lid 16 so that the level of the contents may be seen at a glance. This is not shown in the drawings.

The celluloid solution which is passed to the hopper 11 is carefully freed from air by introducing it into a storage tank where it is kept under a vacuum of from 20–25 inches of mercury for a considerable time, say ten hours, so that bubbles of contained air may separate and rise to the surface. The de-aerated solution is then pressure fed to and transferred by the pump 22 to the hopper 11, passing through a filtering apparatus and cooler on the way.

By this means the solution is rendered air-free, bubble-free and reduced to a temperature of about 8° C. By the gear-pump aforesaid the flow from the cooling apparatus to the hopper is regulated. In the hopper it is maintained at the aforesaid temperature of 8° C. which has been found by practice to lead to a suitable viscosity and to reduce the rate of evaporation of the acetone from the film to a practicable point.

Sheet glass is delivered to the feed rollers 42 by means of a conveyor in a cleaned and dried condition. It may conveniently be brought to this condition by passage through a washing machine similar to the machines employed for the washing of glass in the preparation of photographic plates. The conveyor 48 on the delivery side of the feed hopper 11 enters a bath of castor oil at a slight gradient, insufficient to produce any flow of the still-liquid cellulosic film on the glass. The castor oil, which has been deprived of air in a vacuum tank similar to that employed for de-aerating the celluloid solution, serves to abstract the acetone from the solution of celluloid and thus to dry the film upon the glass. The conveyor lifts the glass sheets out of the castor oil bath after an immersion which may last for about forty minutes, and thereafter the glass is passed through a second heated castor oil bath and finally through an oven heated by steam pipes and out between rubber squeegee rollers which remove the castor oil. The preferred temperature for the first castor oil bath is about 35° to 40° C. and for the second or heated bath about 80° C. The rate of passage of the glass is about sixteen inches per minute and the rate of flow of the castor oil in a direction contrary to the rate of movement of the glass about two-and-a-half gallons per minute in a tank three feet wide.

If preferred the castor oil may be kept in constant circulation through a standard vacuum evaporator for de-aeration and extraction of acetone. The acetone extracted is condensed and re-used in the mixers; the castor oil may be heated if necessary to facilitate driving off the whole of the acetone. If heated it is passed through a cooling apparatus before being returned to the cool bath.

By omitting the means for feeding sheets through the celluloid film and immersing the roller in a castor oil bath, films of celluloid unattached to any backing may be prepared in this apparatus in accordance with the process described in my co-pending United States application Serial No. 690,757 of the same date as the present application.

I claim:—

1. The method of coating a moving strip of material with a cellulosic film, which comprises moving the strip through a downwardly flowing stream of cellulosic material of a width greater than the width of the strip to be coated and in such position that some of the falling stream passes outside the two edges of the strip, and exerting a tension on these outside portions of the stream substantially equal to the tension exerted by the moving strip on the falling stream.

2. The method of coating a moving strip of material with a film of cellulosic material, which comprises feeding sheet material so that it cuts through the normal path of a downwardly flowing stream of cellulosic material of a width greater than the width of the sheet to be coated and conveying away such edge portion at a speed substantially equal to the speed at which the strip is moving, so that the portion of the falling stream beyond either edge of the strip exerts a tension on the outside portion of the stream substantially equal to the tension exerted by the moving strip on the falling stream.

3. The method of coating with a cellulosic film a moving strip of material, which comprises drawing a uniform stream at a uniform rate from a slot of a width greater than the width of the strip to be coated by means of a roller, feeding the sheet material beneath the slot and above the roller, so that it cuts through the normal path of the drawn film from the slot to the roller at a rate substantially equal to the peripheral speed of the roller, whereby sheet material becomes coated on its upper side nearest the slot with a cellulosic film of uniform thickness.

4. Apparatus for coating a moving strip of material, comprising a hopper having a discharge slot transverse to the direction of travel of the strip to be coated and of greater length than the maximum width of the strip, whereby the stream discharging from the hopper is of greater width than the strip, means for moving the strip material under the hopper, and means under the hopper adapted to receive that portion of the falling stream beyond the side edges of the strip being coated and to exert a tension thereon.

5. Apparatus for coating a moving strip of material, comprising a hopper having a discharge slot transverse to the direction of travel of the strip to be coated and of greater length than the maximum width of the strip, whereby the stream discharging from the hopper is of greater width than the strip, means for moving the strip material under the hopper, and a roller under the hopper adapted to receive that portion of the falling stream beyond the side edges of the strip being coated and to exert a tension thereon, said roller being driven at the same speed as that of the strip.

6. Apparatus for coating a moving strip of material, comprising a hopper having a discharge slot transverse to the direction of travel of the strip to be coated and of greater length than the maximum width of the strip, whereby the stream discharging from the hopper is of greater width than the strip, means for moving the strip material under the hopper, means under the hopper adapted to receive that portion of the falling stream beyond the side edges of the strip being coated and to exert a tension thereon, and means for stripping the material from said last-mentioned means.

7. The combination with a hopper for discharging cellulosic material therefrom having inclined sides sloped towards a discharge orifice, of plates on the sides of the hopper forming in effect an extension of the side walls thereof and terminating in lips below the discharge orifice of the hopper, and means for effecting movement of said plates up and down the sides of the hopper, whereby the separation between said lips can be simultaneously adjusted and the vertical elevation changed.

8. The combination with a hopper for discharging cellulosic material therefrom having inclined sides sloped towards a discharge orifice, of plates on the sides of the hopper forming in effect an extension of the side walls thereof and terminating in lips below the discharge orifice of the hopper, means for effecting movement of said plates up and down the sides of the hopper, whereby the separation between said lips can be simultaneously adjusted and the vertical elevation changed, and means for indicating the movement of said plates.

9. The combination with a hopper for discharging cellulosic material therefrom having inclined sides sloped toward a discharge orifice, of plates on the sides of the hopper forming in effect an extension of the side walls thereof and terminating in lips below the discharge orifice of the hopper, said plates being adjustable up and down in an inclined slope along the sides of the hopper, whereby the separation between said lips can be simultaneously adjusted and the vertical elevation thereof changed.

10. The combination with a hopper for discharging cellulosic material therefrom having inclined sides sloped toward a discharge orifice, of plates on the sides of the hopper forming in effect an extension of the sides walls thereof and terminating in lips below the discharge orifice of the hopper, said plates being adjustable up and down in an inclined slope along the sides of the hopper, and means for holding the plates in the position to which they have been adjusted.

11. In apparatus for the production of films or coatings of cellulosic material on sheet material, the combination of a hopper, a feed slot for cellulosic material in the bottom of the hopper, a continuously rotating roller below the feed slot to receive issuing cellulosic material therefrom and to draw it away from the slot at a predetermined rate, and means for feeding sheet material beneath the feed slot and above the roller so that it cuts through the normal path of a film from the slot to the roller.

12. In apparatus for the production of films or coatings of cellulosic material on sheet material, the combination of a hopper, a feed slot for cellulosic material in the bottom of a hopper, a continuously rotating roller below the feed slot to receive cellulosic material issuing therefrom, means for feeding cellulosic material to the hopper at a predetermined rate, whereby the thickness of the film or coating produced is determined by the relative rates of feed to the hopper and rotation of the roller below the hopper, and means for feeding sheet material beneath the feed slot and above the roller so that it cuts through the normal path of the film from the slot to the roller.

CYRIL WILFRED BONNIKSEN.